(12) United States Patent
Tomita

(10) Patent No.: US 7,051,701 B2
(45) Date of Patent: May 30, 2006

(54) DIRECT FUEL INJECTION/SPARK IGNITION ENGINE CONTROL DEVICE

(75) Inventor: Masayuki Tomita, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/038,645

(22) Filed: Jan. 21, 2005

(65) Prior Publication Data

US 2005/0161018 A1    Jul. 28, 2005

(30) Foreign Application Priority Data

Jan. 28, 2004    (JP)    ............................. 2004-020085

(51) Int. Cl.
F02D 41/04    (2006.01)
F00D 43/04    (2006.01)
F02B 17/00    (2006.01)
F01N 3/36    (2006.01)

(52) U.S. Cl. .................... 123/299; 123/295; 60/285

(58) Field of Classification Search ................ 123/295, 123/299, 300, 304, 305, 478, 480; 701/104, 701/105; 60/284, 285

See application file for complete search history.

(56) References Cited

U.S. PATENT DOCUMENTS

| | | | |
|---|---|---|---|
| 5,655,365 A | 8/1997 | Worth et al. | |
| 6,401,688 B1 * | 6/2002 | Teraji et al. | 123/295 |
| 6,659,068 B1 * | 12/2003 | Urushihara et al. | 123/295 |
| 6,688,279 B1 * | 2/2004 | Ishikawa et al. | 123/299 |
| 6,920,862 B1 * | 7/2005 | Pott et al. | 123/299 |
| 6,932,048 B1 * | 8/2005 | Shimazaki | 123/299 |
| 2002/0023431 A1 | 2/2002 | Takemura et al. | |
| 2003/0074890 A1 | 4/2003 | Yamashitab et al. | |
| 2003/0121495 A1 | 7/2003 | Abo et al. | |
| 2003/0192504 A1 | 10/2003 | Nakayama et al. | |

FOREIGN PATENT DOCUMENTS

| | | |
|---|---|---|
| DE | 10115967 A1 | 10/2002 |
| EP | 1158150 A | 11/2001 |
| EP | 1291512 A | 3/2003 |
| EP | 1323915 A | 7/2003 |
| JP | 3325230 B2 | 9/2002 |
| JP | 2004-036461 A | 2/2004 |

* cited by examiner

*Primary Examiner*—Willis R. Wolfe, Jr.
(74) *Attorney, Agent, or Firm*—Shinjyu Global IP Counselors

(57) ABSTRACT

A control apparatus is configured to enhance turbulence in the cylinder produced by the fuel spray, and to improve combustion stability (promote flame propagation) in an ATDC designed to reduce HC and/or achieve early activation of the catalyst. Ignition timing is set to compression top dead center (TDC) or later when needed such as when the catalyst requires warming. In one fuel injection timing, the fuel is injected in two fuel injections with a first fuel injection occurring during the compression stroke, and the second fuel injection being carried out at 45° BTDC or later.

15 Claims, 4 Drawing Sheets

DIRECT FUEL INJECTION/SPARK IGNITION ENGINE CONTROL DEVICE

CROSS-REFERENCE TO RELATED APPLICATIONS

This application claims priority to Japanese Patent Application No. 2004-020085. The entire disclosure of Japanese Patent Application No. 2004-020085 is hereby incorporated herein by reference.

BACKGROUND OF THE INVENTION

1. Field of the Invention

The present invention generally relates to a control device for a direct fuel injection spark ignition engine. More specifically, the present invention relates to a control device that is suitable during cold starting and the other times, or when it is necessary to warm up a catalyst for exhaust purification provided to the exhaust channel.

2. Background Information

One example of a direct fuel injection spark ignition engine with a fuel injection control is disclosed in Japanese Patent No. 3325230. This patent discloses a fuel injection control that is applied when the catalytic converter is in an un-warmed state, i.e., when the temperature of the catalyst is lower than its activation temperature. In this fuel injection control, the fuel injection is divided into at least two injection composed of an early-stage injection and a later-stage injection. Thus, an air-fuel mixture with a partially variable air-fuel ratio is formed in an interval that extends from the intake stroke to ignition timing. In the early-stage injection, fuel is injected prior to the later-stage injection such that an air-fuel mixture with an air-fuel ratio that is leaner than the theoretical air fuel ratio is generated to allow combustion to be extended using the fuel of the later-stage injection. The ignition timing is retarded by a predetermined amount from MBT. The ignition timing in the no-load region of the engine is set to occur prior to the compression top dead center; and ignition timing in the low-speed, low-load region, excluding the no-load region, of the engine is retarded until the compression top dead center or later.

In view of the above, it will be apparent to those skilled in the art from this disclosure that there exists a need for an improved control apparatus for a direct-injection spark-ignition internal combustion engine. This invention addresses this need in the art as well as other needs, which will become apparent to those skilled in the art from this disclosure.

SUMMARY OF THE INVENTION

It has been discovered that ignition timing delay is effective for promoting after burning in order to reduce HC and achieve early catalyst warming when the engine is cold. Ignition (ATDC ignition) preferably occurs at compression top dead center or later to achieve an even greater effect, but the combustion interval must be shortened in order to carry out stable combustion with ATDC ignition. For this reason, the turbulence in the cylinder must be enhanced and combustion velocity (flame propagation velocity) increased. In view of the above, it is possible to consider generating turbulence in the cylinder using the fuel spray injected under high pressure.

In Japanese Patent No. 3325230, however, the first fuel injection (early-stage injection) is principally carried out in the intake stroke and the second fuel injection (later-stage injection) is carried out at 120 to 45° BTDC in the compression stroke, and even if turbulence is generated in the cylinder by the spray from the first fuel injection in the intake stroke, the turbulence weakens in the compression stroke and does not contribute to an increase in the flame propagation velocity at ATDC ignition.

Also, the contribution of the second fuel injection to improved combustion is small in the sense that even if turbulence is generated in the cylinder by the spray prior to 45° BTDC, the turbulence is lessened by the time ATDC ignition occurs.

For this reason, ATDC is more effective in reducing HC and increasing the exhaust temperature, but since combustion is not stabilized, BTDC ignition is used in the no-load range in Japanese Patent No. 3325230.

In view of these facts, an object of the present invention is to improve the combustion stability in ATDC ignition in order to reduce HC during cold starting and the other times and/or to activate the catalyst at an early stage.

In order to achieve the above mentioned object and other objects of the present invention, a direct fuel injection/spark ignition engine control device is provided that basically comprises a fuel injection control section and an ignition timing control section. The fuel injection control section is configured to control fuel injections of a fuel injection valve that directly injects fuel into a combustion chamber. The ignition timing control section is configured to control sparking of a spark plug disposed in the combustion chamber such that an ignition timing is set to ignite fuel at or after a compression top dead center. The fuel injection control section is further configured to set a first fuel injection with a first injection start timing and a first injection end timing that both occur in a compression stroke. The fuel injection control section is further configured to set a second fuel injection having a second injection start timing and a second injection end timing that both occur in a second half of the compression stroke before the compression top dead center.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
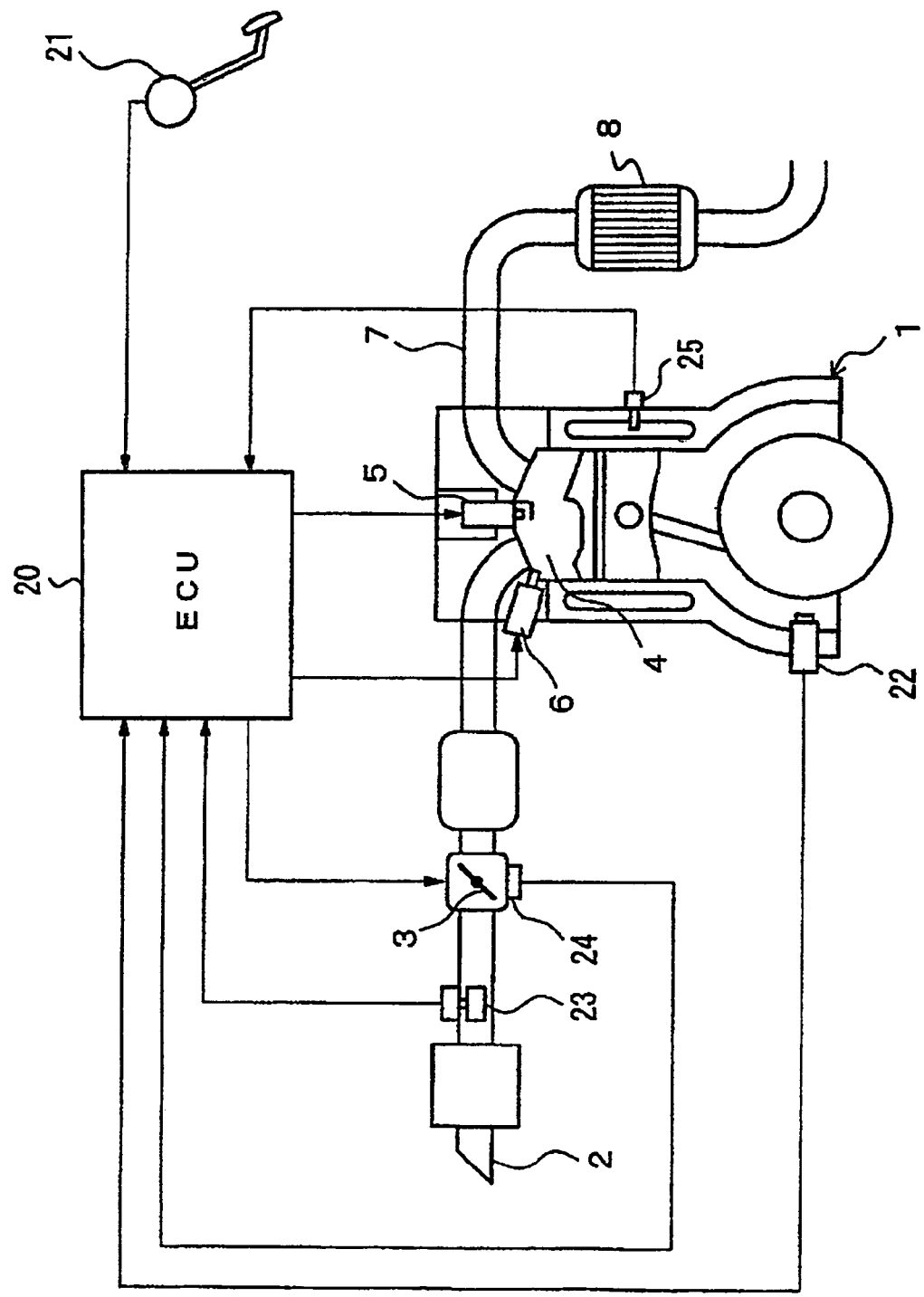
FIG. 1 is a diagrammatic view of an engine system illustrating a direct fuel injection/spark ignition engine control device for an internal combustion engine in accordance with the present invention.

Referring initially to FIG. 1, a direct fuel injection/spark ignition internal combustion engine 1 is diagrammatically illustrated that is equipped with a direct fuel injection/spark ignition engine control device in accordance with a first embodiment of the present invention. The engine 1 has an intake passage 2 with an electronically controlled throttle valve 3 mounted therein. The electronically controlled throttle valve 3 is configured and arranged for controlling the intake air quantity to the intake passage 2 of the engine 1. The intake passage 2 is fluidly connected to a plurality of combustion chambers 4 (only one shown) of the engine 1. Each combustion chamber 4 includes a spark plug 5 and a fuel injection valve 6. The spark plug 5 and the fuel injection valve 6 are mounted to the combustion chamber 4 in a conventional manner. The engine 1 also has an exhaust passage 7 fluidly connected to each combustion chamber 4. The exhaust passage 7 includes a catalytic converter 8 with a catalyst for exhaust purification in a conventional manner.

The engine is controlled by an engine control unit or ECU 20 to perform the controlled combustion of the fuel air mixture as discussed below. Thus, the engine control unit 20 forms a direct fuel injection/spark ignition engine control device that includes a fuel injection control section and an ignition timing control section (see steps S2 and S3 of FIG. 2). In accordance with the present invention, the ignition timing is set to compression top dead center or later when needed such as when the catalyst requires warming. Preferably, a compression stroke fuel injection timing is divided into a first fuel injection that is carried out during the compression stroke and a second fuel injection that is carried out at 45° prior to compression top dead center or later.

The engine control unit 20 is a microcomputer comprising of a central processing unit (CPU) and other peripheral devices. The engine control unit 20 can also include other conventional components such as an input interface circuit, an output interface circuit, and storage devices such as a ROM (Read Only Memory) device and a RAM (Random Access Memory) device. The engine control unit 20 preferably includes an engine control program that controls various components as discussed below. The engine control unit 20 receives input signals from various sensors (described below) that serve to detect the operating state of the engine 1 and executes the engine controls based on these signals. It will be apparent to those skilled in the art from this disclosure that the precise structure and algorithms for the engine control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The opening of the electronically controlled throttle valve 3 is controlled by a stepping motor or other device operated by the signal from the engine control unit 20. Thus, the electrically controlled throttle valve 3 controls the intake air quantity or amount to the combustion chambers 4 of the engine 1 via the intake passage 2.

Each of the fuel injection valves 6 is configured so as to be opened by a solenoid energized by an injection pulse signal outputted from the engine control unit 20 in synchronization with the engine speed during an intake stroke or a compression stroke. Each of the fuel injection valves 6 injects fuel that is pressurized at a prescribed pressure. Thus, the fuel injected is distributed throughout the combustion chamber 4 such that a homogenous air/fuel mixture is formed in the case of an intake stroke injection, and a stratified air/fuel mixture is formed around the spark plug 5 in the case of a compression stroke injection. The air/fuel mixture is ignited by the spark plug 5 based on an ignition signal from the engine control unit 20, and is burned (homogenous combustion mode, stratified combustion mode).

The engine control unit 20 receives input signals from the following sensors: an accelerator pedal sensor 21, a crank angle sensor 22, a hot-wire airflow meter 23, a throttle sensor 24, and an engine coolant temperature sensor 25. The engine control unit 20 executes the engine controls including, but not limited to, the intake air quantity Qa, the ignition timing, the fuel injection quantity and fuel injection timing based on these signals.

The accelerator opening APO is detected by the accelerator pedal sensor 21, which outputs a signal to the engine control unit 20 that is indicative of the depression amount of the accelerator pedal. The engine speed Ne is detected by the crank angle sensor 22, which outputs a signal to the engine control unit 20 that is indicative of the engine speed Ne. The intake air quantity Qa is detected by the airflow meter 23, which outputs a signal to the engine control unit 20 that is indicative of the intake air quantity Qa. The throttle position TVO is detected by the throttle sensor 24, which outputs a signal to the engine control unit 20 that is indicative of the throttle position TVO. The engine coolant temperature or water temperature Tw is detected by the engine coolant temperature sensor 25, which outputs a signal to the engine control unit 20 that is indicative of the engine coolant temperature Tw.

The engine control unit 20 is configured to perform a selected combustion mode (homogenous combustion, stratified combustion) based on the engine operating conditions detected by these input signals, and control the opening of the electronically controlled throttle valve 3, the fuel injection timing and fuel injection quantity of the fuel injection valve 6, and the ignition timing of the spark plug 5 accordingly. Also, under normal operating conditions (after warming-up is completed), extremely lean stratified combustion is performed with an A/F ratio of about 30 to 40 (stratified lean combustion). Homogenous lean combustion (A/F=20 to 30) and homogenous stoichiometric combustion are included in homogenous combustion.

The present invention entails performing optimum combustion control according to load conditions when warming up is required for the catalyst in the catalytic converter 8, which includes cold starting. This type of control is performed by the engine control unit 20 as control from startup through warm-up of the catalyst in accordance with the flowchart in FIG. 2.

Figure 2:
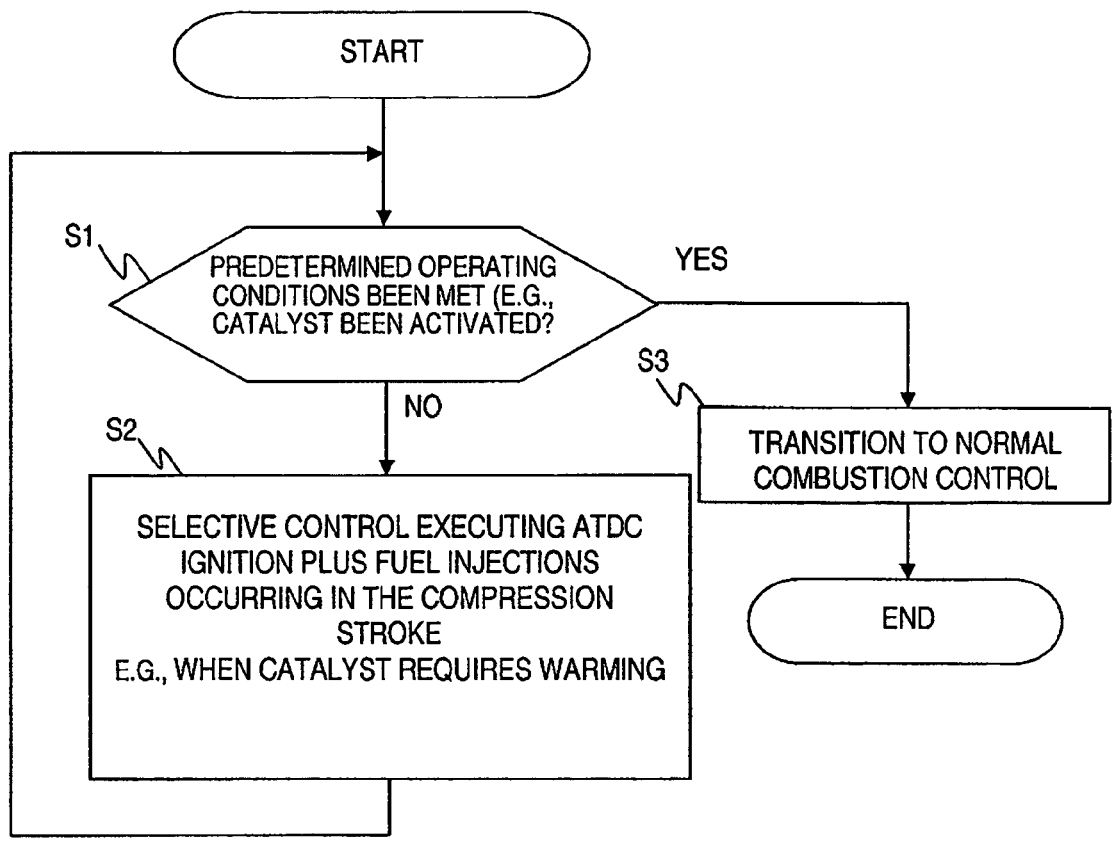
FIG. 2 is a flowchart showing the control operations executed from startup to during warm-up by the control unit of the direct fuel injection/spark ignition engine control device in accordance with the present invention.

The flowchart of in FIG. 2 will now be described, which shows control from startup through warm-up of the catalyst.

In step S1, a determination is made whether the catalyst of the catalytic converter 8 has been activated. Specifically, when a catalyst temperature sensor is provided, the catalyst temperature is detected thereby. When a catalyst temperature sensor is not provided, the catalyst temperature is estimated from the coolant temperature Tw that is detected by the engine coolant temperature sensor 25. The catalyst temperature can alternatively be estimated based on the coolant temperature at startup and the integrated value of the intake amount after startup. In any case, a determination is made whether the detected or estimated catalyst temperature is equal to or greater than the predetermined activation temperature. When the catalyst of the catalytic converter 8 has not been activated, the system advances to step S2.

In step S2, the ignition timing is delayed until compression top dead center (TDC) or later as the type of control performed when the catalyst requires warming. Specifically, the ignition timing is set to between TDC and 15° ATDC to perform ATDC ignition. Also, the fuel injection is preferably divided into two fuel injections that are carried out between the start of the compression stroke and prior to ignition. More preferably, the fuel injections that are carried out such that both the injection start timing and the injection end timing occur in the compression stroke. The air-fuel ratio in the combustion chamber 4 produced by two fuel injections should be stoichiometric or slightly lean (A/F=16 to 17).

The system returns to step S1 after step S2 is complete. When the catalyst of the catalytic converter 8 has been activated by control when the catalyst requires warming, the system advances from step S1 to step S3 and transitions to normal control. In normal control, the above-described stratified lean combustion, homogenous lean combustion, stoichiometric combustion, and other types of combustion are carried out in accordance with the operating conditions.

Next, control performed when the catalyst requires warming is described in detail.

Ignition timing delay is effective for reducing HC and promoting catalyst warming when the engine 1 is cold, and ignition (ATDC ignition) preferably occurs at TDC or later. The combustion time is reduced in order to achieve stable combustion with ATDC ignition, and flame propagation produced by turbulence is therefore promoted.

Figure 3:
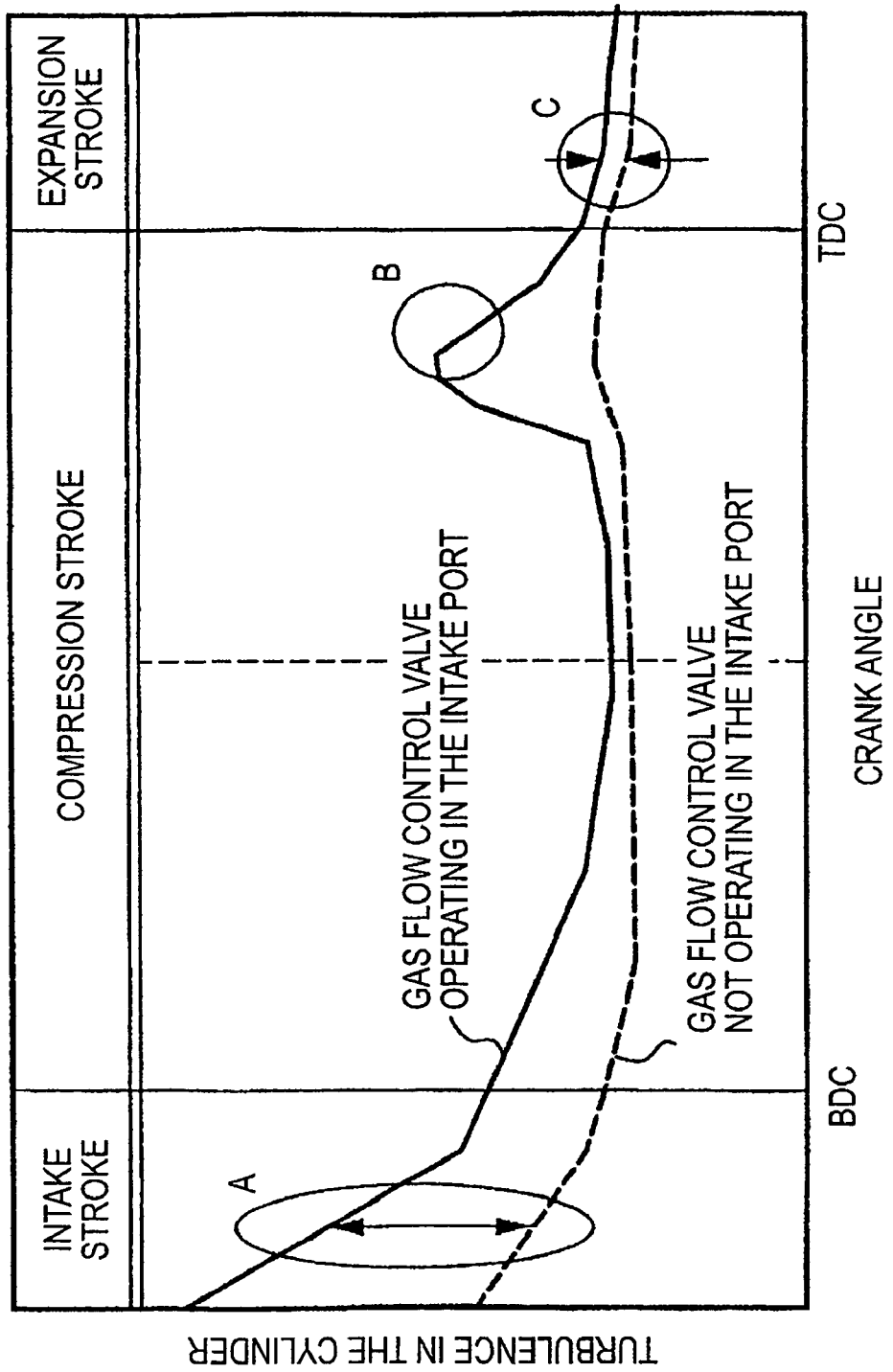
FIG. 3 is a graph showing the turbulence in the cylinder when a gas flow control valve housed in the intake port is used.

The turbulence at ignition timing or later is increased in order to promote flame propagation, and a gas flow control valve (tumble control valve, for example) disposed in the intake port can be operated, for example. It can be seen in FIG. 3 that the turbulence (point A) generated in the intake stroke weakens as the compression stroke progresses. Also even though turbulence is temporarily increased by eliminating (point B) the tumble flow produced by the piston in the second half of the compression stroke, the turbulence weakens at TDC or later (point C), and little improvement (improved flame propagation) in the combustion can be expected to be achieved using this turbulence. For this reason, it is possible to consider using turbulence produced by high-pressure fuel injection.

Figure 4:
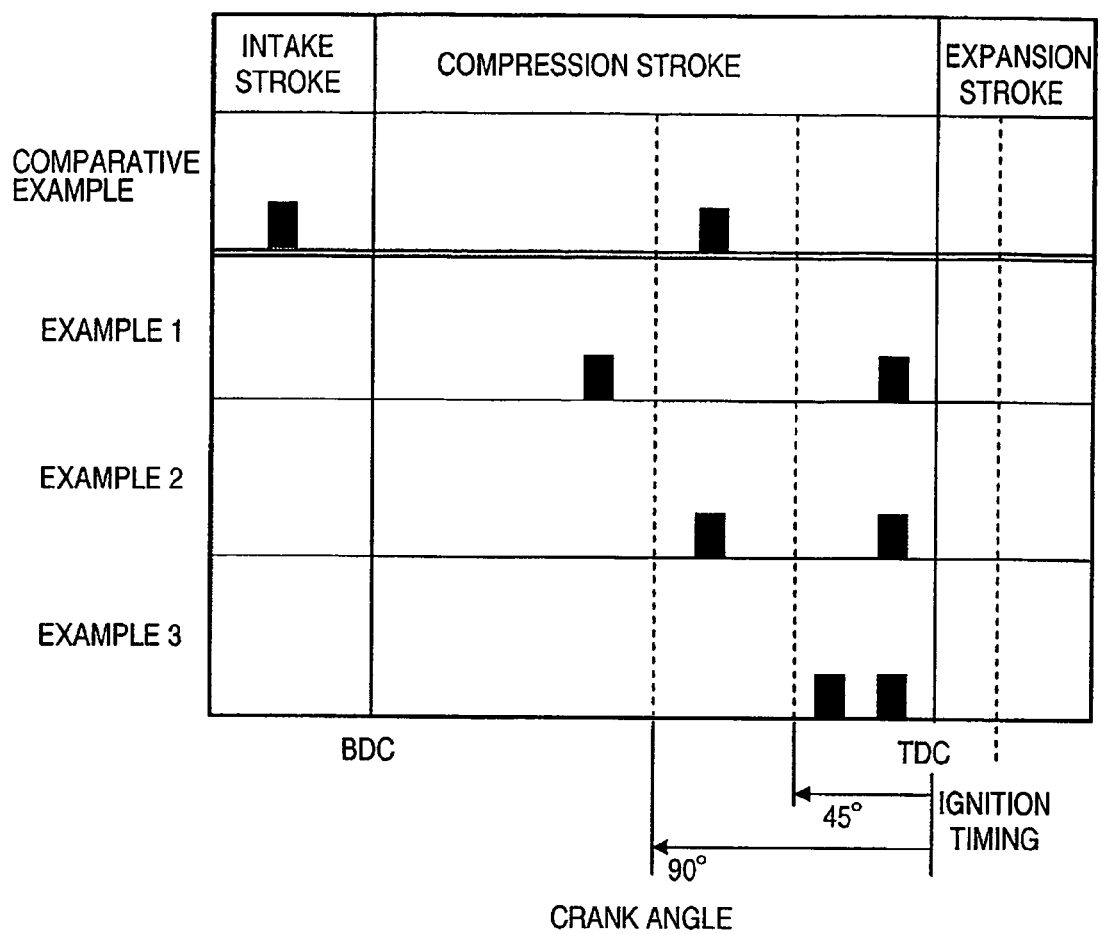
FIG. 4 is a fuel injection timing chart showing the fuel injections in accordance with a first embodiment of the present invention.

As shown in the Comparative Example of FIG. 4, when two fuel injections are executed with the first fuel injection being carried out during the intake stroke and the second fuel injection being carried out in the second half of the compression stroke (90 to 45° BTDC, for example), then the turbulence from the first fuel injection in the intake stroke weakens in the second half of the compression stroke. Thus, little effect is made on ATDC ignition even if a second fuel injection is performed in the second half of the compression stroke.

In view of the above, in Example 1 of FIG. 4, the first fuel injection is carried out during the compression stroke and the second fuel injection is carried out at 45° BTDC or later (preferably 20° BTDC or later). The first fuel injection contributes to a stable ATDC ignition when carried out in the compression stroke and when the time until ignition is short (time from the generation of turbulence to the dissipation thereof). In other words, the turbulence generated by the first fuel injection can be improved or enhance by performing the second fuel injection at 45° BTDC or later (preferably 20° BTDC, or later) after the first fuel injection has been performed. This promotes the flame propagation at ATDC ignition. Here, the first fuel injection is carried out in the first half of the compression stroke. However, greater turbulence can be obtained by carrying out the first fuel injection in the second half of the compression stroke since the turbulence begins to dissipate when the first fuel injection is carried out in the first half of the compression stroke.

It is for this reason that fuel injection is divided into two fuel injections in Examples 2 and 3 of FIG. 4, with both of the fuel injections being performed in the second half of the compression stroke (90° BTDC or later). In particular, in Example 2, the first fuel injection is carried out at 90° BTDC to 45° BTDC and the second fuel injection is carried out at 45° BTDC or later (more preferable timing it 20° BTDC or later). In Example 3, the first fuel injection is carried out at 45° BTDC or later and the second fuel injection is carried out at 20° BTDC or later in order to carry out both fuel injections at 45° BTDC or later so that the turbulence can be further enhanced.

In accordance with the present embodiment, since turbulence is enhanced with the second fuel injection being carried out at 45° BTDC or later in addition to the turbulence generated by the first fuel injection being carried out in the compression stroke, combustion stability can be improved (promotion of flame propagation) when carrying out ATDC ignition to reduce HC and/or achieve early activation of the catalyst by setting the ignition timing to ATDC. In particular, the turbulence in the combustion chamber 4 can be further enhanced and combustion stability improved by carrying out both fuel injections in this case at 20° prior to compression top dead center or later.

In accordance with the present embodiment, turbulence is generated by the first fuel injection in the compression stroke, and the turbulence is enhanced by the second fuel injection in extremely close proximity with ignition timing and stably retained until ignition timing or later by setting the ignition timing to ATDC when the catalyst requires warming, and dividing fuel injection into two fuel injections in which the first fuel injection is carried out during the compression stroke and the second fuel injection straddles the compression TDC or is carried out in the expansion stroke prior to ignition timing. Combustion stability can therefore be improved (flame propagation promoted) when carrying out ATDC ignition to reduce HC and/or achieve early activation of the catalyst.

In accordance with the present embodiment, by setting the ignition timing to ATDC when needed such as when the catalyst requires warming, and executing two fuel injections between the second half of the compression stroke and ignition timing, turbulence is generated by the first fuel injection in the compresion stroke, and the turbulence is additionally enhanced by the second fuel injection. In particular, since a stronger turbulence can be formed before flame propagation timing by carrying out the first fuel injection in the second half of the compression stroke, combustion stability can be improved (promote flame propagation) when carrying out ATDC ignition to reduce HC and/or achieve early activation of the catalyst.

In particular, the turbulence in the combustion chamber 4 can be enhanced and combustion stability improved by carrying out both fuel injections in this case at 45° BTDC or later, and furthermore carrying out the first fuel injection at 45° BTDC or later and the second fuel injection at 20° BTDC or later.

In accordance with the present embodiment, after burning can be promoted with the required amount of oxygen necessary for after burning by adopting an approach in which the air-fuel ratio produced by the second fuel injection in the combustion chamber is set be stoichiometric or slightly lean (A/F=16 to 17).

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A direct fuel injection/spark ignition engine control device comprising:
    fuel injection controlling means for controlling fuel injections of a fuel injection valve that directly injects fuel into a combustion chamber; and
    ignition timing controlling means for controlling ignition of a spark plug disposed in the combustion chamber such that an ignition timing is set to ignite fuel at or after a compression top dead center,
    the fuel injection controlling means being further configured to set a first fuel injection with a first injection start timing and a first injection end timing that both occur in a compression stroke,
    the fuel injection controlling means being further configured to set a second fuel injection with a second injection start timing and a second injection end timing that both occur in a second half of the compression stroke before the compression top dead center, the fuel injection control means being further configured to set the second injection start timing of the second fuel injection at or after 20° CA before the compression top dead center.

2. A method of controlling a direct fuel injection/spark ignition engine comprising:
    controlling fuel injections of a fuel injection valve that directly injects fuel into a combustion chamber;
    controlling ignition of a spark plug disposed in the combustion chamber such that an ignition timing is set to ignite fuel at or after a compression top dead center;
    setting a first fuel injection with a first injection start timing and a first injection end timing that both occur in a compression stroke; and
    setting a second fuel injection with a second injection start timing and a second injection end timing that both occur in a second half of the compression stroke before the compression top dead center, the setting of the second fuel injection including setting the second injection start timing of the second fuel injection at or after 20° CA before the compression top dead center.

3. A direct fuel injection/spark ignition engine control device comprising:
    a fuel injection control section configured to control fuel injections of a fuel injection valve that directly injects fuel into a combustion chamber; and
    an ignition timing control section configured to control sparking of a spark plug disposed in the combustion chamber such that an ignition timing is set to ignite fuel at or after a compression top dead center,
    the fuel injection control section being further configured to set a first fuel injection having a first injection start timing and a first injection end timing that both occur in a compression stroke, and the fuel injection control section being further configured to set a second fuel injection having a second injection start timing and a second injection end timing that both occur in a second half of the compression stroke before the compression top dead center, the fuel injection control section being further configured to set the second injection start timing of the second fuel injection at or after 20° CA before the compression top dead center.

4. The direct fuel injection/spark ignition engine control device according to claim 1, wherein
    the fuel injection control section is further configured to set the fuel injection timings upon receiving a command to increase exhaust gas temperature.

5. The direct fuel injection/spark ignition engine control device according to claim 1, wherein
    the fuel injection control section is further configured to set the fuel injection timings such that when the first and second fuel injections are completed, an average air-fuel ratio inside the combustion chamber is in an air-fuel ratio range between around stoichiometric and slightly lean.

6. The direct fuel injection/spark ignition engine control device according to claim 1, wherein
    the fuel injection control section is further configured to set the first injection start timing of the first fuel injection in a second half of the compression stroke.

7. The direct fuel injection/spark ignition engine control device according to claim 6, wherein
    the fuel injection control section is further configured to set the fuel injection timings upon receiving a command to increase exhaust gas temperature.

8. The direct fuel injection/spark ignition engine control device according to claim 6, wherein
    the fuel injection control section is further configured to set the compression stroke fuel injection timing such that when the first and second fuel injections are completed, an average air-fuel ratio inside the combustion chamber is in an air-fuel ratio range between around stoichiometric and slightly lean.

9. A direct fuel injection/spark ignition engine control device comprising:
- a fuel injection control section configured to control fuel injections of a fuel injection valve that directly injects fuel into a combustion chamber; and
- an ignition timing control section configured to control sparking of a spark plug disposed in the combustion chamber such that an ignition timing is set to ignite fuel at or after a compression top dead center,
- the fuel injection control section being further configured to set a first fuel injection having a first injection start timing and a first injection end timing that both occur in a compression stroke, and the fuel injection control section being further configured to set a second fuel injection having a second injection start timing and a second injection end timing that both occur in a second half of the compression stroke before the compression top dead center, the fuel injection control section being further configured to set the first fuel injection timing of the first fuel injection at or after 45° CA before the compression top dead center.

10. The direct fuel injection/spark ignition engine control device according to claim 9, wherein
the fuel injection control section is further configured to set the fuel injection timings upon receiving a command to increase exhaust gas temperature.

11. The direct fuel injection/spark ignition engine control device according to claim 9, wherein
the fuel injection control section is further configured to set the fuel injection timings such that when the first and second fuel injections are completed, an average air-fuel ratio inside the combustion chamber is in an air-fuel ratio range between around stoichiometric and slightly lean.

12. The direct fuel injection/spark ignition engine control device according to claim 9, wherein
the fuel injection control section is further configured to set the second fuel injection timing of the second fuel injection at or after 20° CA before the compression top dead center.

13. The direct fuel injection/spark ignition engine control device according to claim 12, wherein
the fuel injection control section is further configured to set the fuel injection timings upon receiving a command to increase exhaust gas temperature.

14. The direct fuel injection/spark ignition engine control device according to claim 12, wherein
the fuel injection control section is further configured to set the fuel injection timings such that when the first and second fuel injections are completed, an average air-fuel ratio inside the combustion chamber is in an air-fuel ratio range between around stoichiometric and slightly lean.

15. The direct fuel injection/spark ignition engine control device according to claim 14, wherein
the fuel injection control section is further configured to set the fuel injection timings upon receiving a command to increase exhaust gas temperature.

* * * * *